Dec. 12, 1967  H. R. CHOPE  3,358,279
POSITION INDICATING APPARATUS
Filed Sept. 19, 1963  5 Sheets-Sheet 1

INVENTOR
HENRY R. CHOPE
BY Cushman, Darby & Cushman
ATTORNEYS

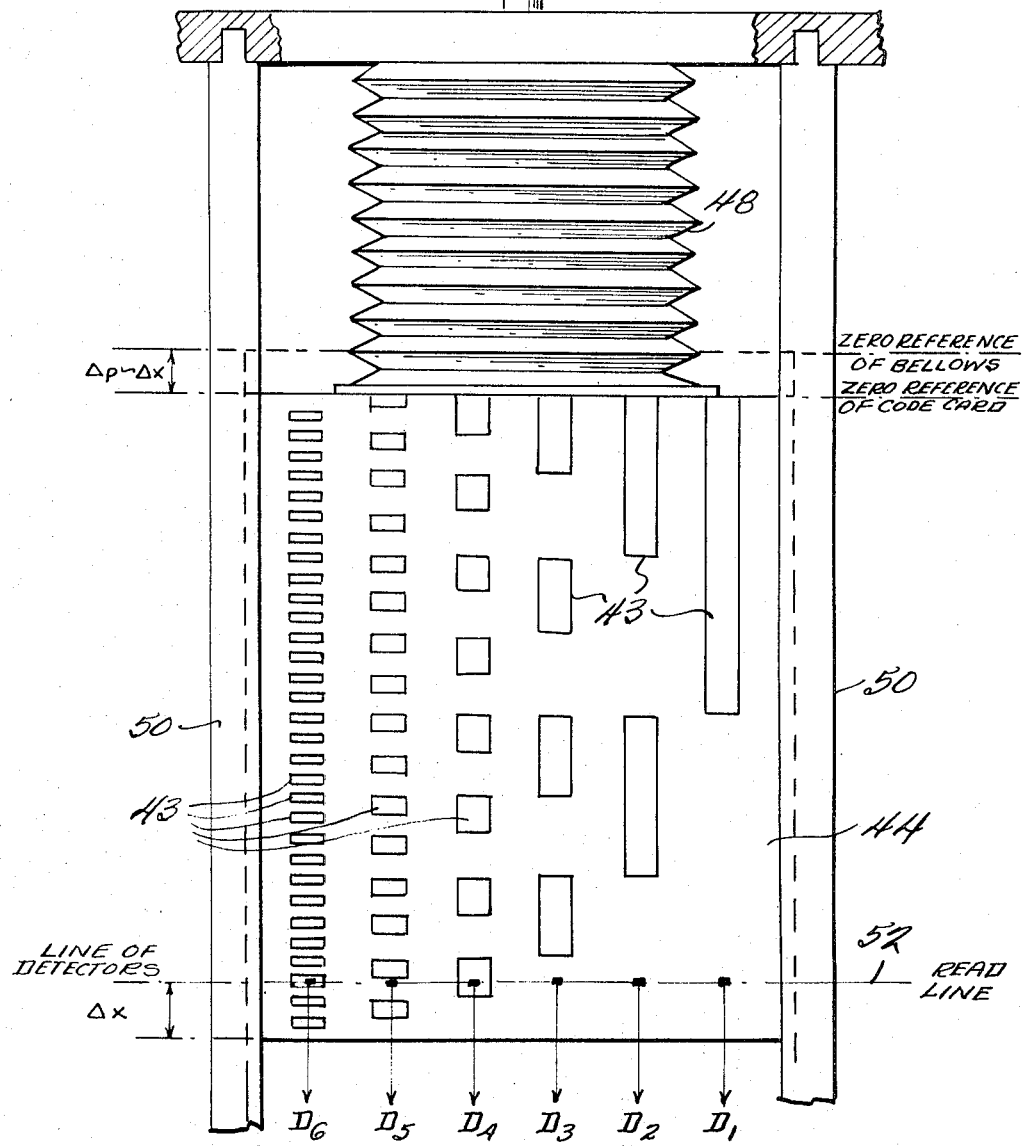

INVENTOR
HENRY R. CHOPE

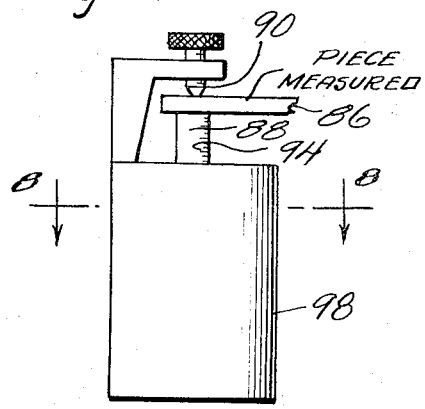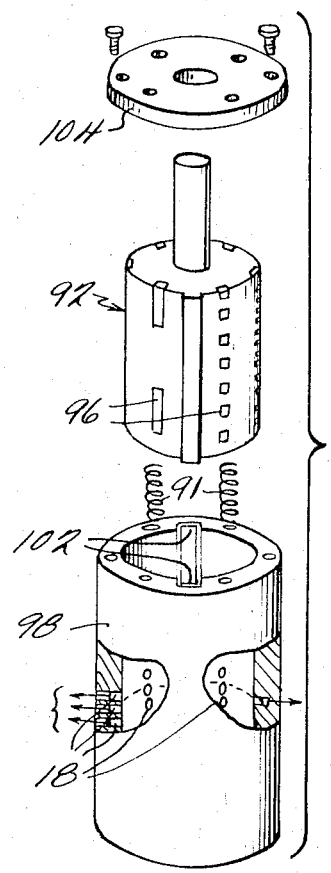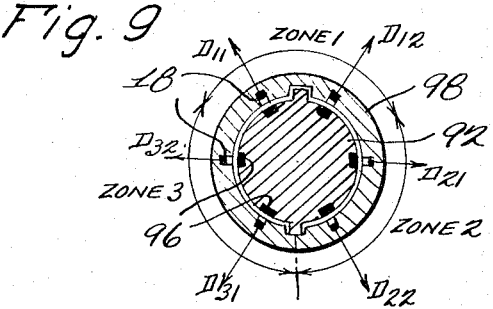

United States Patent Office 3,358,279
Patented Dec. 12, 1967

3,358,279
POSITION INDICATING APPARATUS
Henry R. Chope, Columbus, Ohio, assignor to Industrial
Nucleonics Corporation, a corporation of Ohio
Filed Sept. 19, 1963, Ser. No. 309,948
23 Claims. (Cl. 340—347)

This invention relates to position indicating apparatus, and more particularly to such apparatus of a digital nature, i.e., which is digitally coded nucleonically to provide a digital output signal for indicating the instant position, including motion, of a code element in the apparatus.

According to the purpose of the apparatus, it may be employed in various equipment, for example, to encode translational (rectilinear) or rotational motion into a binary code for readout of position or motion, to provide an analog to digital converter which is simple, highly reliable, and accurate, to effect a transducer for measuring physical variables, or to provide a displacement micrometer, all of which represents objects of this invention.

This invention is also concerned with the employment of various binary codes of the unit distance type, such as the well known Gray code, which represent decimal digits, and another object of this invention is the embodiment of an improved binary coded decimal unit distance code in which the number of code tracks can be less than the number of digits in the binary member, in particular two tracks for four binary digits. Coding may be accomplished nucleonically and the coded element may be employed in the digital position indicating apparatus above mentioned.

As background information relative to some embodiments of such apparatus, the following may be considered. It is often necessary to determine the translational or angular position of a mechanical member such as a rod or shaft. Devices which do this are often referred to as motion encoders or angle resolvers. Several types of these devices are in common usage.

One type is referred to as the brush-commutator encoder. In this device conducting code segments form a pattern along parallel or concentric code zones or tracks. When the brush makes contact with a conducting segment, the output can be considered as a "1." When the brush makes contact with a nonconducting segment, the output is considered to be "0." With proper patterns and multiple brush pickups, the position of a code disc or card can be read out. The brush commutator pattern encoders possess many shortcomings: the brushes are susceptible to vibration and acceleration forces, which can cause intermittent contacts and with time shift the position of the brushes; intermittent contacts and brush misalignments cause ambiguities in readings; and brush wear is also a problem.

An encoder which attempts to overcome some of the difficulties of the brush-commutator encoder is referred to as an optical encoder. In this device, a light source is positioned on one side of a coding disc or card with a photoelectric reading device on the other. The position of the coding disc between the light source and the photoelectric reading device is detected and encoded according to a pattern of absorbing and transmitting figures on the disc. These optical encoders eliminate some of the problems inherent in the commutator encoder such as wear, disc or card life, and shift in brush position. Nevertheless, the optical encoders introduce other problems: First, to obtain a precision light beam for "reading" individual tracks or zones along the disc requires a rather involved optical system of lenses and slits. The optical system can easily become misaligned in environments of vibration and accelerating forces. Secondly, the associated electronic logic and reading circuits are more complicated with an optical encoder than with a brush system. Finally, the light source may be troublesome.

There is described and claimed herein new and novel apparatus for overcoming the limitations and disadvantages of the contacting and optical types of encoders.

Further objects, advantages, and a better understanding of the invention and the various illustrated embodiments thereof may be had by reference to the appended claims and the following detailed description in conjunction with the drawings, in which:

FIGURE 4 illustrates a pressure transducer utilizing principles of this invention;

FIGURE 7 shows an elevational view of a digital micrometer utilizing principles of this invention;

FIGURE 8 is a cross-sectional view taken along the line 8—8 of FIGURE 7; and

FIGURE 9 is an exploded perspective of the FIGURE 7 gauge.

Relative to this invention, it should be understood that for measuring translational or rectilinear motion, a code element such as a rectangular card may be used on which coded segments are read out along parallel lines, as discussed later on in this application. On the other hand, for measuring rotational or angular motions, a circular code element such as a disc is used on which code segments are read out along concentric circles. In the description of this invention, the words "code disc" and "code card" may generally be used interchangeably. It should be understood that a code element with straight tracks is best used to encode and read out translational motion, whereas one with circular tracks is best used to encode and read out rotational or angular motion.

There are three general types of nucleonics digital position indicating devices or encoders. These may be referred to as:

(1) Transmission types
(2) Self-excited types
(3) Externally excited types.

Figure 1:
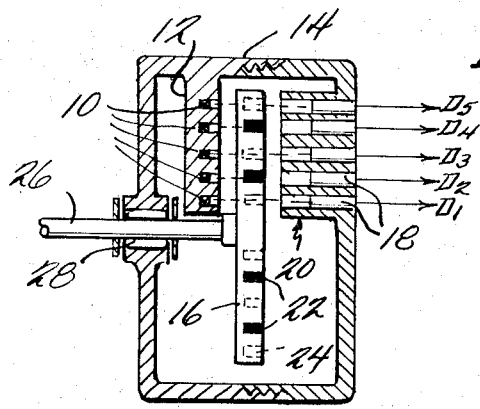
FIGURE 1 is a cross-sectional view of a transmission type nucleonics digital shaft encoder.

In the transmission type of nucleonics encoder as shown in FIGURE 1, five radioactive sources 10 are mounted at different radial positions in a source collimator 12 which integrally extends inwardly from the encoder housing 14. The collimating apertures for sources 10 open only toward one side of a coding element or disc 16, and five corresponding detectors 18 are mounted on the other side in respective collimators 20. Disc 16 is divided into a corresponding number (five) of concentric circles or tracks which are nucleonically encoded. For each track, there is one source and one detector. Being collimated each source 10 emits a fine "pencil" beam of radiation. As the radiation passes through the coding disc, it is transmitted or absorbed according to whether or not there is an absorbing segment 22 in the transmission path. The absorbing segments are laid out along each track according to a desired binary code formed by the combinations of all the coding tracks. The coded length and spacings of the absorbing segments may be similar to that shown for the radiation source segments in FIGURE 2, for example. For purposes of explaining this invention, an absorbing segment which blocks radiation to the detector can be considered as a binary "1" and transmission of the radiation beam through a "slot" 24 can be considered as a binary "0." This convention is here followed, though such is not necessary in accordance with this invention, in order that the absorbing segments 22 or equivalent coatings in the transmission encoder of FIGURE 1 will correspond to the other types of deposited or coated coding segments in the other two types of encoders later described.

Each radiation detector 18 opposite its corresponding track is so collimated that only the thin pencil beam of radiation enters the detector. The output from each radiation detector is fed to an "AND" gate which also receives a pulse from a read pulse generator. The associated detector circuits are described hereinafter in connection with the other types of nucleonics encoders (see FIGURE 7). Angular movements of the digital coding disc 16 between sources 10 and detectors 18, as may be caused by the analog rotation of shaft 26 in bearing 28, are converted to an appropriate binary code based upon the presence or absence of signals at the detectors. A five digit (or level) code may be obtained from the binary signals on the detector output lines $D_1$–$D_5$. This type of transmission nucleonics encoder has a distinct advantage over the brush-commutator conventional encoder in that no contact is made between the code disc and the source or the detector. It also has advantage over the optical encoder (which employs a light source and a light detector) in that an involved optical system of lenses and focusing devices is not required.

Any desirable type of radio active material may be used. For example, radio active nickel 63, which is made active after being applied to the code disc, or small glass beads, such as those made by Minnesota Mining & Mfg. Co. and called, "microspheres" encapsulating strontium-90 or any other desired beta emitter, may be employed in this and later embodiments.

Absorbers 22 need only be such as to give an appreciable reduction in radiation transmission so as to cause a sufficient change in radiation detected compared to the full detection from the no absorber areas. One tenth inch or so of aluminum or organic material of comparable density may be used.

The radiation detector may be of several types. Since only an "on" or "off" signal is required from the detector, a number of solid state radiation detectors are quite usable. For example, for indicating the presence or absence of beta radiation (high-speed electrons), a cadmium sulfide crystal is a useful detector. Other solid state detectors that can be used are cadmium selenide, lithium drifted P-I-N, silicon surface barrier, lead sulfide, thallium sulfide, and selenium types.

Figure 2:
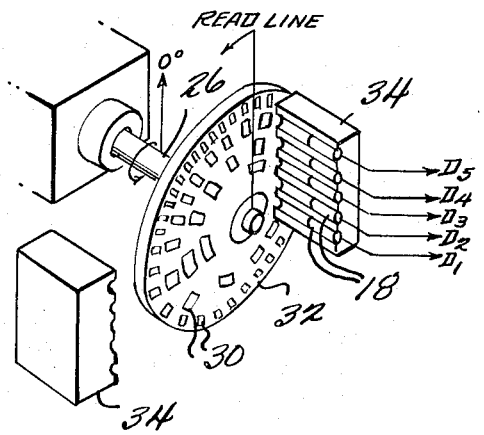
FIGURE 2 is a perspective view of a self-excited type nucleonics digital shaft encoder.
Figure 2A:
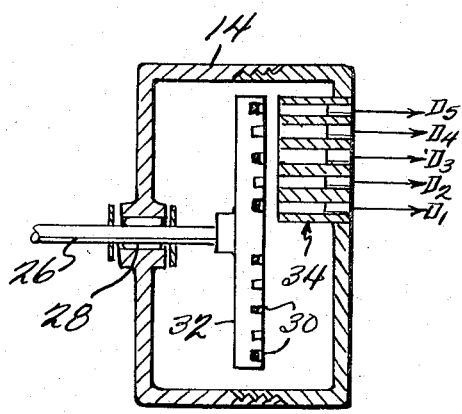
FIGURE 2A is a cross-sectional view of the FIGURE 2 encoder.

The second type of nucleonics digital encoder is referred to as a self-excited encoder. An example thereof is shown in FIGURES 2 and 2A. In this type, thin-line radiation source segments 30 are arranged on the coding disc 32 in five parallel columns or concentric circles called tracks, according to desired binary codes. The position movements of the coded radiation patterns are detected by multiple radiation detectors 18. Instead of being inset as shown in FIGURE 2A, the various coding segments 30 may be deposited onto the coding element or disc 32. With this arrangement, a high degree of spatial resolution is obtained from the radiation pattern emanating from the source. Each detector is placed near and in line with its corresponding track, and a collimator 34 is placed in front of each detector to provide sharp spatial resolution between the "on" and "off" portions of each code segment.

In the case of the self-excited encoder, the presence of a radiation segment 30 and hence a signal at the corresponding radiation detector is considered as a binary "1," whereas the absence of the segment and a corresponding signal is considered a binary "0." Once again, there is no physical contact made between the code pattern and the detector. Whereas for present-day brush-commutator encoders, a brush width of 5 mils and a commutator segment width of 20 mils are minimum dimensions, radiation sources may be deposited with the width of approximately one mil. (One mil equals .001".) Besides being deposited, the radiation source segments 30 may be attached or otherwise mounted in or on the coding disc.

As shown in FIGURE 2, the five radiation detectors 18 are positioned in a "read line" which is radial as illustrated. Movement of the input shaft 26 causes various unique combinations of the detectors to be illuminated or irradiated and hence yield a signal on their respective output line $D_1$–$D_5$. The combination of signals from the detectors is thus a measure of the shaft's position. As previously indicated, the individual source segments 30 are inset into the code disc in FIGURE 2A. This insetting of the radiation source causes a degree of collimation, and the combination of source inset and detector collimation provides a thin pattern of radiation between the source and detector. This arrangement, therefore, yields an extremely fine dimensional resolution.

Figure 3:
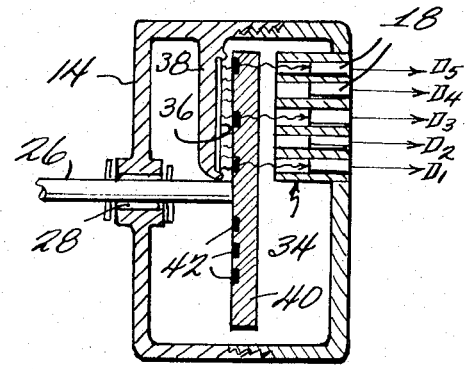
FIGURE 3 is a cross-sectional view of an externally excited type nucleonics digital shaft encoder.

A third type of nucleonics position indicating apparatus or digital encoder is the externally excited type such as shown in FIGURE 3. This type makes use of the fact that when high-speed electrons are decelerated by a material of high atomic number, such as tungsten or lead, the energy of the electrons is converted into corresponding bremsstrahlung X-rays. The use of bremsstrahlung X-radiation in measuring devices is described in the Foster Patent No. 2,933,606, and the Foster Reissue Patent No. 25,353. In the externally recited nucleonics encoder, a radial line source of radiation, such as the beta exciting source 6 in FIGURE 3, is secured in an arm 38 which depends from the casing so that source 36 faces the side of code disc 40 opposite the radial read line on which the five detectors 18 are disposed in their respective collimators. The code disc is constructed of material of low atomic number so as to have a low yield of bremsstrahlung X-rays. When a code segment 42 of high atomic number is positioned due to the movement of the code disc between the exciting source of beta radiation and a given detector, the portion of the segment opposite the source becomes a radiation emitter. The code segments act as an X-ray target in a manner quite similar to that found in a conventional electrical X-ray tube. The radiation detectors 18 in this embodiment are sensitive to X-ray energies. A solid state detector suitable for this purpose is the cadmium sulfide cell.

An advantage of the externally excited encoder of FIGURE 3 is that segments 42 of the code disc do not emit radiation and hence are not radioactive until a part of the segment is positioned directly opposite the source. The single line source placed on one side of the coding disc can be well collimated and shielded.

Although the above explanation illustrated the principle of operation and some physical embodiments of different versions of this invention, greater insight into its reliable operation can be obtained by considering certain binary coding techniques. In many everyday operations, decimal numbers are used. By a decimal number, it is meant that numbers and magnitudes are described by combinations of 10 digit symbols (0 to 9). The values of successive digits (for example, the number 248) differ by a factor of 10; that is, the position of a digit in a number determines its value. For example, the number 248 is a shorthand for the value $2 \times 100 + 4 \times 10 + 8$. While decimal numbers are useful for human convenience, they are awkward for manipulation of quantities in high-speed data processing machines.

A system of numbers which uses only two possible digit symbols (0 and 1) is called a binary number system. The binary number 101 is shorthand for $1 \times 2^2 + 0 \times 2^1 + 1 \times 2^0$. Listed in Table I below are the decimal numbers 0 to 12 and their simple binary equivalents.

TABLE I

| | |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |

The foregoing pure or simple binary code is utilized in the embodiment of this invention illustrated in FIGURE 4 which shows a mechanism for converting the change in a physical variable (pressure) to a corresponding displacement. Many measuring instruments or transducers exist for converting the value of a measured quantity into a corresponding electrical signal. Most of these measuring instruments yield an output signal which is of a continuous or analog form. The device herein described relates to an instrument for measuring physical variables, such as acceleration, vibration, pressure, and temperature, whose output is an encoded digital signal. There is disclosed in my patent application, Ser. No. 56, 849, Radiation Transducers, filed Sept. 19, 1960, one type of nucleonics transducers in which either an analog or digital signal can be obtained. However, the digital signal therein is obtained as a train of pulses which can be counted for precise predetermined periods. The individual pulses result from the character of individually detected radiation events. The present invention does away with the relatively complex circuitry set forth in that application to obtain a digital signal, by directly coding the displaceable element digitally.

Mechanical translator means for accomplishing conversion to displacement from variables such as acceleration, pressure, and temperature, are disclosed in more detail in that copending application of mine, Ser. No. 56,849, now Patent No. 3,158, 028, and also in my copending application, Ser. No. 283, 406, filed May 27, 1963. The displacement caused by such mechanical translators from a $\Delta P$ change in the physical variable is in turn detected in accordance with this invention, by the corresponding $\Delta X$ movement of an encoding card 44 in the embodiment of FIGURE 4. Deposited or otherwise mounted on the coding card are thin-line radiation sources 43 arranged in parallel coded zones or tracks in accordance with Table I, for example, but not necessarily so since any other desired code may be used. Movements of the coded radiation pattern are detected by multiple "on-off" radiation detectors 18 in a manner somewhat similar to the operation of a mechanical commutator encoder.

FIGURE 4 illustrates the operation of one of such a digitally encoded transducer used to measure pressure. Pressure changes entering through the pressure tube 46 cause the pressure bellows 48 to expand or contract. The expansion or contraction of the bellows cause a displacement and movement of the thin illustrated code card 44 in suitable channels in the frame members 50 on each side edge of the card. Laid out along six parallel, vertical columns or tracks on the code card are patterns made up of the alternate source segments 44. When the detectors 18 which are disposed in FIGURE 4 on read line 52 are immediately above a source segment 44, they are illuminated and yield an output signal over their respective output line $D_1 - D_6$. When a detector is not above a source segment, it is not illuminated and does not yield an output signal. The movement of the code card and its position at any time is determined by the combination of radiation detectors illuminated along the read line. As suggested below, particular binary codes may be selected which will provide a pattern that is easily detected and causes minimal ambiguities in the output from a line of detectors.

Although the simple binary code as illustrated in Table I above is logical and easily understood and usable in accordance with the invention as just described, it may not be the best code system for a given encoding apparatus. It is possible to construct a number of binary codes in which there is an arbitrary relationship between the sequence of binary symbols (0 or 1) and the corresponding decimal number or magnitude. Certain of these special codes are best suited for shaft and translational encoders.

A disadvantage of the simple binary code can be seen from the above tabulation. Assume that the reading detectors (for example, as shown in FIGURE 2) are immediately over the pattern corresponding to 0111 (the decimal number 7). As the reading line now moves in the direction of increased numbers, the next number read should be 1000 (the decimal number 8). Note that in this transition between consecutive numbers, four binary digits (bits) were required to change. If one of the detectors was misaligned, the number read out could be indicated as 1111 and then followed by 1000. The intermediate reading, 1111, is clearly incorrect.

Binary codes are available in which changes between successive numbers require only one binary digit to change. If numerical representation is so chosen that only one digit can change between successive numbers, then the maximum ambiguity existing at a transition will be either the old number or the new number, but no other. Codes that satisfy the requirement of a single digit change between successive numbers are called unit distance codes, an example of which is the Gray binary code first described in the Gray Patent No. 2,632,058 and alternately referred to as the cyclic binary code in Brenner et al. 2,685,054 and as the reflected binary code in Yaeger 2,793,807. These codes are extremely useful in motion encoders.

Although apparatus considerations restrict the choice of digit symbols to only two, it is often convenient to use a number base other than two. For example, the base 10 can still be used if each decimal digit is represented by a group of four two-valued symbols. Such codes are referred to as binary coded decimal numbers. In Table II below, there are illustrated four different binary coded decimal number systems. These are referred to in the table as Code 1, Code 2, Code 3, and Code 4. Each of these codes is also a unit distance code. Further, there is unit distance (i.e., only one binary digit changes between successive numbers) at decade transitions (9–10, 19–20, 29–30, etc.) in each of these codes.

A particularly useful unit distance code is that labeled Code 4 in Table II. It will be noticed that in the units columns, there are five consecutive "1's" found in each of the left three columns i.e. in the three highest order columns. This means that in three out of four columns, the code segment can be five units long. Normally, the segment pickups (i.e., a brush or else a radiation detector in this invention) are positioned in a line perpendicular to the individual code tracks. However, by using Code 4 in Table II, one segment, five units long, with three brushes each positioned along the segment two units distances apart, will take the place of three segments along three tracks. Thus, the total number of segments per decimal number is reduced from four to two.

TABLE II

| Decimal Number | Unit Distance (U-D) Decimal Codes with UD at the Decade Transition | | Decimal Code with Reflected Decades | | Unit Distance Code with 3 Equal Zone Patterns | |
|---|---|---|---|---|---|---|
| | Code 1 | | Code 2 | | Code 3 | | Code 4 | |
| | Tens | Units | Tens | Units | Tens | Units | Tens | Units |
| 0 | 0000 | 0000 | 0000 | 0000 | 0000 | 0000 | 0001 | 0001 |
| 1 | 0000 | 0100 | 0000 | 0001 | 0000 | 0100 | 0001 | 0011 |
| 2 | 0000 | 1100 | 0000 | 0011 | 0000 | 1100 | 0001 | 0010 |
| 3 | 0000 | 1000 | 0000 | 0010 | 0000 | 1000 | 0001 | 0110 |
| 4 | 0000 | 1010 | 0000 | 1010 | 0000 | 1001 | 0001 | 0111 |
| 5 | 0000 | 1110 | 0000 | 1011 | 0000 | 1011 | 0001 | 1111 |
| 6 | 0000 | 0110 | 0000 | 1001 | 0000 | 1010 | 0001 | 1101 |
| 7 | 0000 | 0010 | 0000 | 1000 | 0000 | 1110 | 0001 | 1100 |
| 8 | 0000 | 0011 | 0000 | 1100 | 0000 | 0110 | 0001 | 1000 |
| 9 | 0000 | 0001 | 0000 | 0100 | 0000 | 0010 | 0001 | 1001 |
| 10 | 0100 | 0000 | 0001 | 0000 | 0100 | 0010 | 0011 | 0001 |
| 11 | 0100 | 0100 | 0001 | 0001 | 0100 | 0110 | 0011 | 0011 |
| ... | | | | | | | | |
| 18 | 0100 | 0011 | 0001 | 1100 | 0100 | 0110 | 0011 | 1000 |
| 19 | 0100 | 0001 | 0001 | 0100 | 0100 | 0010 | 0011 | 1001 |
| 20 | 1100 | 0000 | 0011 | 0000 | 1100 | 0010 | 0010 | 0001 |
| 21 | 1100 | 0100 | 0011 | 0001 | 1100 | 0110 | 0010 | 0011 |
| ... | | | | | | | | |
| 98 | 0001 | 0011 | 0100 | 1100 | 0010 | 0110 | 1001 | 1000 |
| 99 | 0001 | 0001 | 0100 | 0100 | 0010 | 0010 | 1001 | 1001 |

Figure 5:
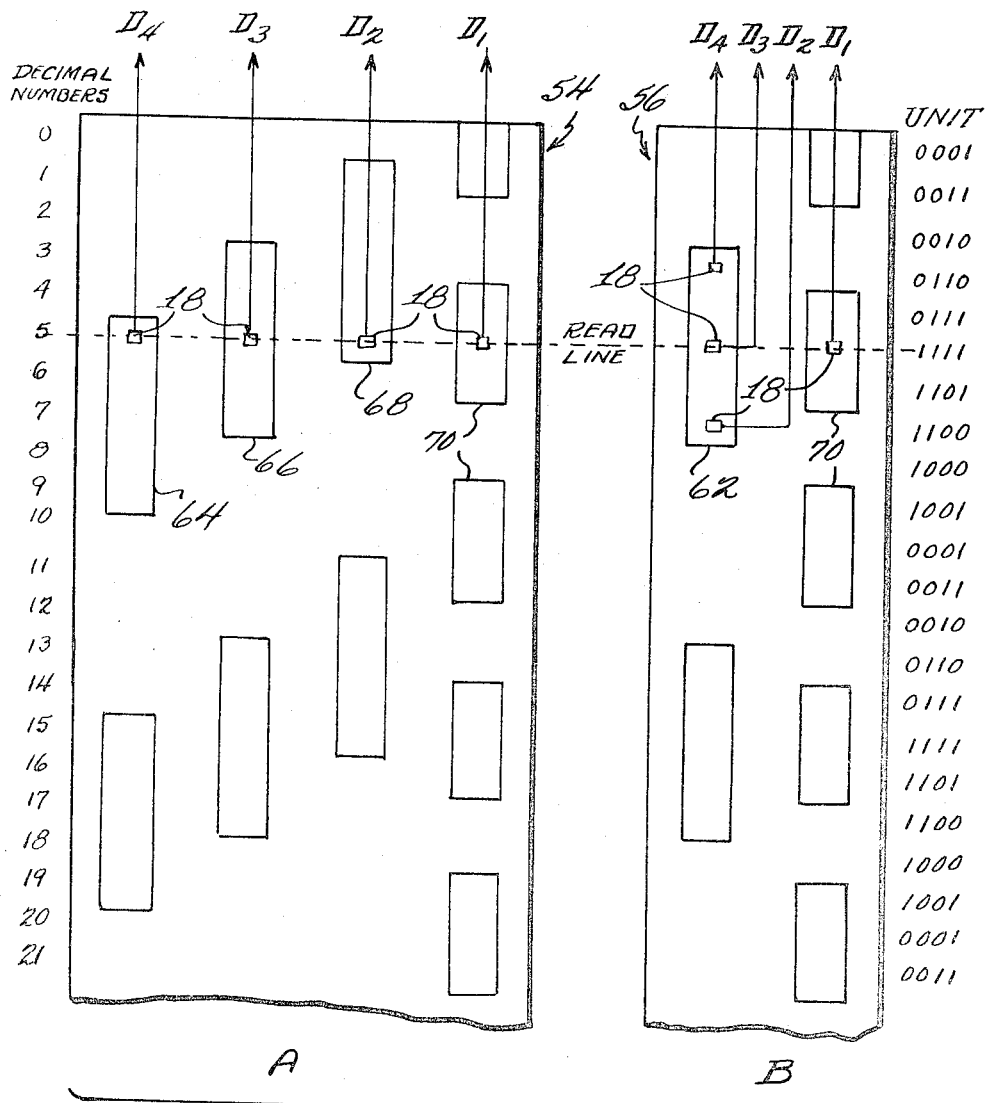
FIGURE 5 shows two code card and detector embodiments utilizing a unique unit distance code.

There are shown in FIGURE 5 two equivalent embodiments 54 and 56 of a translational digital encoder which uses Code 4. It can be seen that insofar as signals on output lines $D_1$ through $D_4$ from the respective set of four detectors 18 in the embodiments 54 and 56 are concerned, the two-track card 58 is equivalent to card 60 with four tracks. In embodiment 56, the single coding strip 62, which may be radioactive replaces the three similar strips 64, 66, 68 in embodiment 54 for the first decade. Successive decades are similar. The decimal numbers on the left and corresponding binary numbers on the right are fairly accurately disposed relative to cards 58 and 60 to indicate the successive positions thereon at which accurate readings of the code segments by the respective set of four detectors can take place. It will be appreciated upon inspecting embodiment 56 that the lowermost order (right) detector is in transverse alignment with the middle detector over segment 62 with the other two detectors being respectively upstream and downstream two read positions or unit distances away. In either of the embodiments 54 and 56, the lowest order column of code segments 70 are two unit distances or read positions apart and three long except the first which is only two. The five unit long code segments in each embodiment are five units apart lengthwise, and in embodiment 56 every other one is centered on a segment 70. The detectors for FIGURE 5 are preferably small solid state radiation detectors, which need be operated only as two-state devices, conducting or nonconducting.

Figure 6:
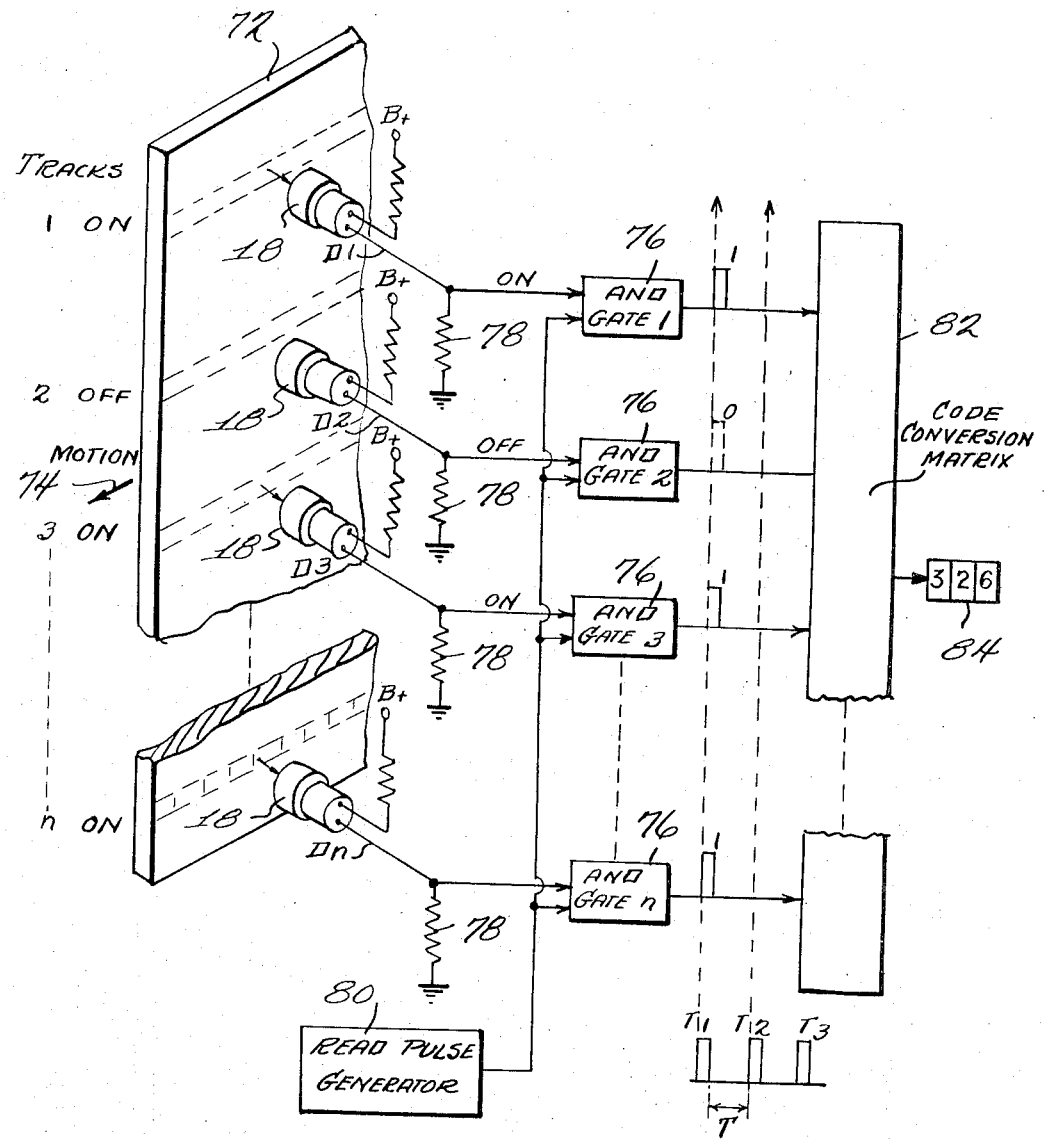
FIGURE 6 illustrates a simplified circuit for reading the coded detector outputs.

In FIGURE 6 there is shown a simplified circuit connection for reading the outputs of detectors 18 in any of the embodiments herein setforth. The tracks on the coded element or card 72 extend in the direction of arrow 74, and each has a detector 18 associated therewith. There is an "AND" gate 76 for each detector, and two inputs to each AND gate. One input is the "on" or "off" signal from the radiation detector as developed across the respective resistor 78; the other is a repetitive pulse with intervening intervals T, from the read pulse generator 80. An output pulse (corresponding to a binary "1"), is obtained from an AND gate only when the corresponding radiation detector is illuminated. A code conversion matrix 82 receives the outputs from the various AND gates. The function of the conversion matrix is to convert the particular code used on the disc or card code element 72 to one which is more useful for readout, for example by a decimal counter or register 84, or for inputs to associated data processing equipment. The encoded outputs can be in either serial or parallel forms, depending upon whether the pulse outputs from the read pulse generator are applied to the AND gates simultaneously as illustrated, or in sequence.

FIGURES 7–9 show a digital position indicating apparatus in the form of a displacement micrometer constructed in accordance with this invention. The thickness of an object 86 is measured by placing the object between a micrometer rod 88 and a zero reference surface such as a zero set screw 90. When the measuring rod 88 is flush against a measured piece of finite thickness as pushed thereagainst by the compression springs 91, the coding cylinder 92 is displaced longitudinally from its zero position as will be evident by the visual scale 94 on the rod. Around the circumference of the coding cylinder and parallel to its axis are six radioactive code tracks 96 divided into three zones of two tracks each coded as on card 58 in FIGURE 5 to represent four binary digits. Each zone represents a different decimal number. That is, the particular code used is the one above described in which a set of two tracks and four detectors 18 yield one decimal digit. The detectors are disposed in the cylindrical housing 98 in which the coding cylinder 96 can slide longitudinally only because of the mating ribs 100 and raceways 102. The cylinder is held in the housing by top plate 104 which secures to the upper end of the housing as by the screws shown. This digital displacement gauge subdivides movements of the coding cylinder into 999 increments, and has a resolution of approximately 0.1% over its operating range. The output of the gauge is in coded form and can be used to directly illuminate readout lights or else the output can be applied to other digital data processing devices.

All of the above nucleonics digital encoders and transducers have high utility for converting angular or translational movements into particular binary codes. Such encoders possess certain advantages over both of the prior art type brush-commutator and optical encoders. In terms of spatial resolution, the nucleonics encoder would have a capability between that of the brush-commutator, which it betters, and that of the optical encoder, but the nucleonics encoder is considerably simpler and more reliable than the optical encoder.

Thus there has been described equipment which provides for all the objects and advantages herein mentioned. Other objects and advantages, and even further embodiments of the invention will become apparent to those of ordinary skill in the art after reading this disclosure. However, it is to be understood that the described embodiments are illustrative and not limitative, the scope of the invention being described by the appended claims.

What is claimed is:

1. Position indicating apparatus comprising:
   a plurality of nucleonic radiation detector means positioned relative to one another in a prescribed relationship,
   a member facing said detector means,
   means for causing adjacent relative movement between said detector means and member whereby different portions of said member may be presented to said detector means at different times,
   means, including coding means in said member portions, for conditionally causing rays of nucleonic radiation to be directed in accordance with a prescribed code outwardly in the general direction of said detector means for detection thereby while each said member portion is presented to said detector means as aforesaid, and
   means responsive to the outputs of said detector means for providing an indication of the present relative position of said member and detector means.

2. Apparatus as in claim 1 wherein the said detector output responsive means includes reading means and means for gating the detector outputs simultaneously thereto to effect a reading thereof.

3. Position indicating apparatus comprising:
a plurality of nucleonic radiation detector means positioned relative to one another in a prescribed relationship,
a member facing said detector means,
means for causing adjacent relative movement between said detector means and member whereby different portions of said member may be presented to said detector means at different times,
means, including coding means in said member portions, for conditionally causing rays of nucleonic radiation to be directed in accordance with a prescribed code outwardly in the general direction of said detector means for detection thereby while each said member portion is presented to said detector means as aforesaid, and
means responsive to the outputs of said detector means for providing an indication of the present relative position of said member and detector means,
wherein said member has, as said coding means, a plurality of nucleonically encoded tracks coded, in conjunction with the said prescribed relationship of said detector means, to represent different binary numbers at different ones of said member portions.

4. Position indicating apparatus comprising:
a plurality of nucleonic radiation detector means positioned relative to one another in a prescribed relationship,
a member facing said detector means,
means for causing adjacent relative movement between said detector means and member whereby different portions of said member may be presented to said detector means at different times,
means, including coding means in said member portions, for conditionally causing rays of nucleonic radiation to be directed in accordance with a prescribed code outwardly in the general direction of said detector means for detection thereby while each said member portion is presented to said detector means as aforesaid, and
means responsive to the outputs of said detector means for providing an indication of the present relative position of said member and detector means,
wherein said member comprises a rotatable disc having as said coding means a plurality of circumferentially extending nucleonically encoded tracks respectively for said detectors, said detector means being respective detectors disposed on a line substantially parallel to a radial line of the disc.

5. Apparatus as in claim 4 wherein said means for conditionally causing nucleonic radiation includes a plurality of nucleonic radiation sources respectively for said detectors, said coding means being in each said portion of each said track for effecting a binary code by allowing or preventing said radiation to reach the respective detector when the portion in question is on the said radial line.

6. Apparatus as in claim 5 wherein said sources are disposed on the opposite side of said disc as said detectors, and said coding means includes a plurality of radiation absorbers in prescribed ones of said portions of each disc track, the remainder of the portions being capable of transmitting said radiation.

7. Apparatus as in claim 4 wherein the said means including coding means for conditionally causing nucleonic radiation includes a plurality of sources of such radiation disposed in accordance with a binary code in each of said portions of each track for irradiating or not the respective detector when the portion in question is on the said radial line.

8. Apparatus as in claim 4 wherein said conditional radiation causing means includes radioactive beta emitting source means disposed to irradiate the side of said disc opposite said detectors, the nucleonic encoding of each said track being by alternate segments therein of materials of relatively high and relatively low atomic number, said detectors being of the type that respond to the X-ray bremsstrahlung radiation generated only by the impinging of the said beta radiation onto the said high atomic number segments.

9. Position indicating apparatus comprising:
a plurality of nucleonic radiation detector means positioned relative to one another in a prescribed relationship,
a member facing said detector means,
means for causing adjacent relative movement between said detector means and member whereby different portions of said member may be presented to said detector means at different times,
means, including coding means in said member portions, for conditionally causing rays of nucleonic radiation to be directed in accordance with a prescribed code outwardly in the general direction of said detector means for detection thereby while each said member portion is presented to said detector means as aforesaid, and
means responsive to the outputs of said detector means for providing an indication of the present relative position of said member and detector means,
wherein said member has, as said coding means, a plurality of nucleonically encoded tracks coded in conjunction with the said prescribed relationship of said detector means, in accordance with a binary digital code pattern for designating decimal numbers, said digital code pattern having four binary digits per decimal order with the characteristics of a unit distance code and of five consecutive ones in each of the three highest order columns of said four digits in accordance with the following table:

| Decimal number: | Code pattern |
|---|---|
| 0 | 0001 |
| 1 | 0011 |
| 2 | 0010 |
| 3 | 0110 |
| 4 | 0111 |
| 5 | 1111 |
| 6 | 1101 |
| 7 | 1100 |
| 8 | 1000 |
| 9 | 1001 | successive ones in any column of the binary digital code pattern in said table being represented by a continuous coded segment of a said track.

10. Apparatus as in claim 9 wherein the number of said tracks per decimal order is four.

11. Apparatus as in claim 9 wherein the number of said tracks for each said decimal order is two, one for the lowest order column and the other for the said three highest order columns of said four binary digits; said detector means for each decimal order being four in number, one for the said lowest order track and three for the said other track disposed longitudinally thereof two unit distances apart with the middle one being in transverse alignment with the said lowest order track detecting means; said coded segments for the said lowest order track being substantially two unit distances apart with those for the other track being substantially five unit distances long and five apart and centered on every other one of the lowest order segments.

12. Position indicating apparatus comprising:
a plurality of nucleonic radiation detectors positioned relative to one another in a prescribed relationship,
a member facing said detectors, means for causing adjacent relative movement between said detectors and member whereby successive portions of said member may be substantially aligned with said detectors successively in the order of their occurrence, nucleonic source means, including binary coding means in said member portions, for causing a plurality of beams of nucleonic radiation to be directed in accordance with a prescribed code outwardly in the general direction of said detectors for respective detection thereby while each successive member portion is aligned with said detectors as aforesaid, and means responsive to the outputs of said detectors for providing an indication of the present relative position of said member and detectors.

13. An encoding element having a plurality of tracks each having discrete code segments representing binary 1's and adjacent some of said segments spaces representing binary 0's to effect by all of said tracks a code pattern representing four bit binary coded decimal numbers in accordance with the following table:

| Decimal Number: | Code Pattern |
| --- | --- |
| 0 | 0001 |
| 1 | 0011 |
| 2 | 0010 |
| 3 | 0110 |
| 4 | 0111 |
| 5 | 1111 |
| 6 | 1101 |
| 7 | 1100 |
| 8 | 1000 |
| 9 | 1001 | wherein said code segments are radioactive sources for yielding penetrating radiation.

14. An encoding element as in claim 13 wherein the number of said tracks is four.

15. An encoding element as in claim 13 wherein the number of said tracks is two and the coding by the said code segments in at least one track represents a plurality of bits in each four bit number.

16. For use in a digital position encoder to indicate the position of an element by a binary coded decimal number having four bits per decimal digit, the improvement of said element having only two juxtaposed tracks coded with discrete code segments to represent said four bits, a first track being coded for the lowest order and the other for the three highest orders, consecutive four bit binary numbers being readable from said tracks at successive unit distances, the code segments for the said lowest order track being substantially two unit distances apart and substantially three unit distances long, the code segments for the said other track being substantially five unit distances long and five apart and being substantially centered on only alternate ones of the lowest order segments.

17. For use in a digital position encoder to indicate the position of an element by a binary coded decimal number having four bits per decimal digit, the improvement of said element having only two juxtaposed tracks coded with discrete code segments to represent said four bits, a first track being coded for the lowest order and the other for the three highest orders, consecutive four bit binary numbers being readable from said tracks at successive unit distances, the code segments for the said lowest order track being substantially two unit distances apart and substantially three unit distances long, the code segments for the said other track being substantially five unit distances long and five apart and being substantially centered on only alternate ones of the lowest order segments, in combination with four detectors positioned adjacent said two tracks and therealong movable relative to said element for detecting the presence of said code segments, a first one of said detectors being positioned adjacent said first track, the other three detectors being disposed longitudinally of the other track at positions substantially two unit distances apart with the middle one of the three detectors being in transverse alignment with said first detector.

18. An encoder for indicating angular or translational position and movements comprising multiple radioactive sources for yielding penetrating radiation, corresponding detectors therefor, and a movable code element disposed between said sources and detectors and including a coded pattern of radiation absorbing areas for causing the present position of the code element to be determined by the instant unique combination of said detectors irradiated by said sources.

19. An encoder for indicating angular or translational position and movements comprising a movable code element including radioactive sources for yielding penetrating radiation, said sources being distributed according to a particular numerical code, and detectors of said radiation so positioned with respect to the said movable element and its sources that the position and movement thereof can be precisely determined and readout by the detectors.

20. An encoder for indicating angular or translational position and movements comprising a movable code element including alternate segments of materials of relatively high and relatively low atomic number arranged in accordance with a prescribed code pattern, a radioactive beta emitting source positioned to illuminate one side of said code element and generate coded X-ray bremsstrahlung radiations by the impingement of beta radiation onto the said material segments of high atomic number, and detector means positioned on the other side of said code element for responding to said bremsstrahlung radiations and determining the position and motion of said element by indicating which detector means is illuminated thereby.

21. An analog to digital converter comprising:

a movable code element on which are parallel tracks of radioactive material including discrete radioactive source segments having along their respective tracks a length and spacing which is in accordance with a particular binary code, multiple radiation detectors adjacent said element for determining the position thereof by detecting the radiation pattern from the said sources which are adjacent the detectors to give a digital output representing position in accordance with said code, and means for moving said element in accordance with an analog quantity.

22. A nucleonics digital displacement gauge comprising:

a coding cylinder having on its periphery at least one zone of a plurality of tracks running longitudinally of the cylinder and coded with a respective plurality of radioactive source segments of length and spacing along their respective tracks according to a particular binary code, a housing having an aperture for receiving said cylinder with predetermined clearance and including means for urging said cylinder up through said aperture, means for forming a zero reference position between said cylinder and housing and for receiving material to be gauged by displacing the said cylinder and housing and a plurality of radiation detectors disposed in predetermined position in said housing for detecting the instant unique radiation pattern from the adjacent ones of said source segments and providing a digital output representing in accordance with said code the displacement caused by said material.

23. A gauge as in claim 22 wherein said zone has only two said tracks and said binary code is binary coded decimal with four binary digits per decimal digit, one track representing one digit and the other track the other three digits, said radiation detectors being four in number, one being disposed along said one track and three along said other track for respectively detecting the lowest and three highest of said four binary digits.

References Cited

UNITED STATES PATENTS

| | | | |
|---|---|---|---|
| 2,692,951 | 10/1954 | Voelker | 235—92 |
| 3,021,518 | 2/1962 | Kliman et al. | 340—347 |
| 3,043,962 | 7/1962 | Jones | 340—347 |
| 3,092,402 | 6/1963 | Reed | 235—61.12 |
| 3,165,731 | 1/1965 | Spaulding | 340—347 |
| 3,223,842 | 12/1965 | Hyde | 340—347 |

FOREIGN PATENTS 800,190 8/1958 Great Britain.

DARYL W. COOK, *Acting Primary Examiner.*

MAYNARD R. WILBUR, *Examiner.*

K. R. STEVENS, W. KOPACZ, *Assistant Examiners.*